Jan. 8, 1952      T. S. SEE      2,581,449
HIGH-SPEED MACHINING OF FERROUS MATERIALS
Filed June 30, 1950      2 SHEETS—SHEET 1
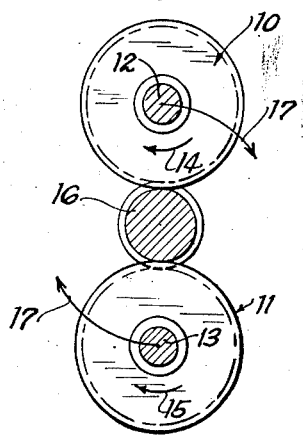
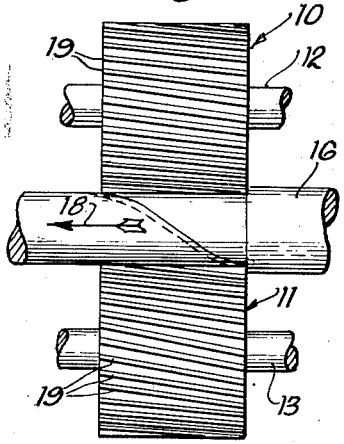
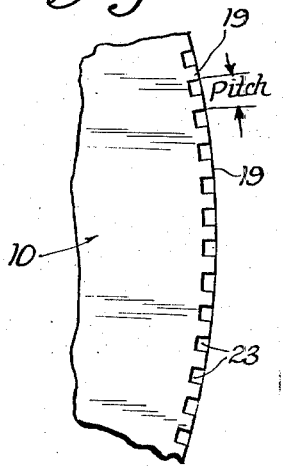
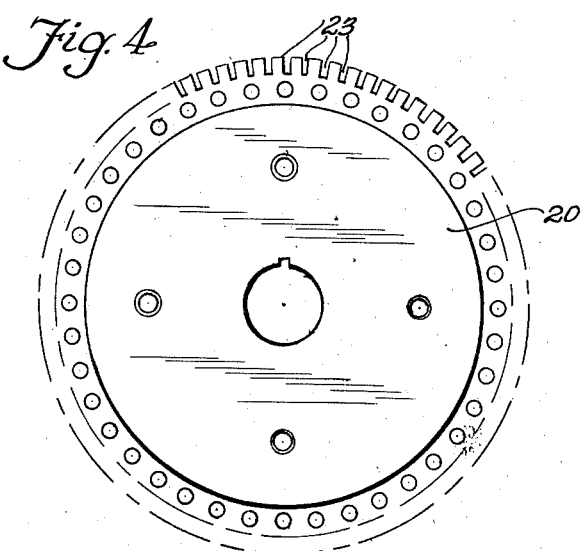
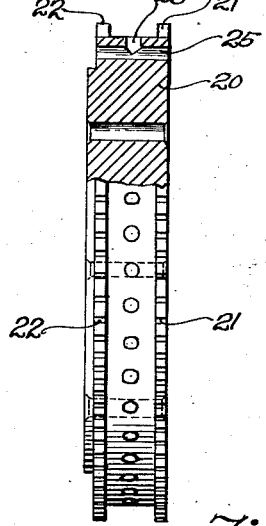
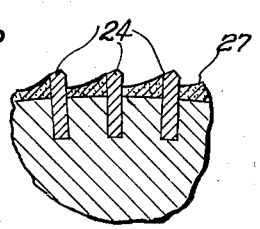
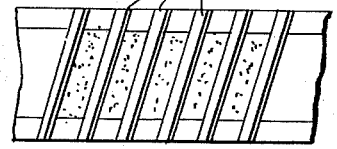
INVENTOR.
Theodore S. See
BY Mason, Kolehmainen, Rathburn & Wyss
Attorneys Jan. 8, 1952            T. S. SEE            2,581,449

HIGH-SPEED MACHINING OF FERROUS MATERIALS

Filed June 30, 1950            2 SHEETS—SHEET 2

INVENTOR.
Theodore S. See
BY Mason, Kolehmainen, Rathburn & Wyss
Attorneys

Patented Jan. 8, 1952

2,581,449

UNITED STATES PATENT OFFICE 2,581,449

HIGH-SPEED MACHINING OF FERROUS MATERIALS

Theodore S. See, Hammond, Ind., assignor to La Salle Steel Company, Chicago, Ill., a corporation of Delaware Application June 30, 1950, Serial No. 171,397

6 Claims. (Cl. 90—11)

This invention relates to new and improved methods for machining or milling ferrous work pieces, more particularly to methods of milling steel at speeds far in excess of those heretofore considered possible while maintaining a practical cutter life, and the invention has for an object the provision of novel and practical methods of this character.

This application is a composite application constituting a continuation in part of each of my prior applications Serial No. 7,372, filed February 10, 1948, for Milling Machine and Method; Serial No. 92,724, filed May 11, 1949, for High Speed Machining of Ferrous Materials; and Serial No. 107,262, filed July 28, 1949, for Milling Machine and Method.

In the metal removal art, and particularly in the machining or milling of ferrous work pieces, it has heretofore been considered economically impractical, if not impossible, to operate the cutters relative to the work at speeds as high as would be desirable because of the destruction or undue wear of the cutters after relatively short periods of operation at such high speeds. Industry is primarily interested in the rate at which a work piece can be machined without unduly shortening the useful life of the cutter, or, in other words, in the maximum number of inches per minute that the work piece and the cutter can be moved relative to each other while metal is being removed from the work piece while maintaining maximum cutter life. This rate of metal removal, which may be referred to as the inches per minute (I. P. M.) or the R factor, has been used as a basis for comparing metal removal techniques and represents the product of the chip load or tooth load, the number of teeth on the cutter, and the speed of rotation (R. P. M.) of the cutter. This R factor does not, however, accurately reflect the relative merits of the cutting techniques, since it fails to take into account the cutter life, i. e., the length of time that the cutter may be operated without regrinding or replacement. For purposes of accurate comparison, therefore, reference should be had to what may be termed an RL factor, which consists of the product of the metal removal rate or R factor and the duration of the tool life between grinds.

It will be appreciated that the RL factor is thus an accurate measure not of the rate at which metal is removed or of the rate at which the work piece may be moved through the machine for some short or abnormal period during which abnormal wear or even destruction of the tool or cutter may occur, but of the rate at which machining operations may be carried out on a long time production basis while maintaining adequate tool life.

While it is readily apparent that the RL factor may theoretically be increased merely by increasing one of the component factors from which it is determined, i. e., the chip load, the R. P. M., or the number of teeth, it has not heretofore been found possible to do so without shortening the cutter life or the time between grinds to such an extent as to result in a decreased rather than an increased RL factor. Furthermore, it has previously been thought that all three of the factors which constitute the I. P. M. or R factor were subject to definite limitations precluding any increase beyond the conventionally accepted maximums. The chip load, for example, has had limiting minimum and maximum values determined by the cutting material, since too small a tooth load or chip load results in abrasive action causing excessive wear and heating of the cutting element while too large a chip load results in excessive compressive forces destructive of the cutting tooth.

Similarly, the R. P. M. of the cutter or tool has heretofore been considered as limited by the permissible surface foot rate, i. e., the number of feet per minute traveled by the teeth or cutting elements (S. F. M.), which is determined by the ability of the cutting element to contact the particular work piece and remove metal therefrom while remaining in satisfactory cutting condition for reasonable periods of operation. This ability of the cutting element has previously been thought to depend largely upon the hardness of the work piece, the design of the cutter and the cutting elements in so far as the rake angle and the radial angle are involved, and the material from which the cutting element is formed.

The number of teeth employed, although not so severely limited, has in the past not been increased beyond the conventionally accepted standards due to the expense of initially producing and repairing monolithic cutters in which the entire cutter body and the cutting teeth are formed of relatively expensive cutting material and due to the mechanical difficulties of securing more than the standard number of individual cutting teeth or elements on the surface of a cutter body formed of softer and less expensive material, by means of wedges, screws or similar mechanical attaching means. The expedient of brazing the cutting elements or teeth on the cutter body, while permitting the provision of a greater number of teeth per circumference inch has not been employed to any great extent for the reason that, as with the monolithic cutter, a cutter so constructed is expensive to maintain and, where carbide cutting teeth or elements are concerned, the brazing of the carbide to a steel body or matrix destroys much of the effectiveness of the carbide from a cutting standpoint. Although it has heretofore been proposed to mount the cutting elements in a matrix of organic plastic or low fusing point alloy forming the body of the cutter, no attempt has been made in constructions of this character to increase the number of teeth per inch for the purpose of increasing the permissible speed of operation. In fact the literature shows a definite tendency in the art to decrease the number of teeth. See, for example, the article entitled Tools and Methods for High Speed Machining, Tool Engineer, April 1943, pp. 81–83.

The recognized maximum surface foot rates presently employed in cutting steel, while utilizing high speed tool steel for the cutting element, are in the neighborhood of 40 to 75 S. F. M. This means that with a four inch diameter cutter the R. P. M. of the cutter would, at the maximum S. F. M., be approximately 75 R. P. M. A conventional cutter of this diameter having a tooth pitch of one inch, which is in the neighborhood of the minimum tooth pitch provided under conventional practice, would thus have twelve teeth, and if an average tooth load of .005 inch is employed, the feed rate would be approximately 4½ I. P. M.

When carbide cutting elements or teeth are employed, mounted in conventional fashion on a spider or hub, the various factors that determine the I. P. M. or R factor have been successfully increased without so decreasing the cutter life as to lower the RL factor, but these increases, while resulting in a slight increase of the RL factor, have been minor as compared to the increases achieved in practicing the methods of the present invention. Thus, the surface foot rate for carbide cutters when employed on steel or cast iron is recognized as ranging from 250 to 1,000 S. F. M., and is usually in the neighborhood of 500 S. F. M. Speeds in the higher range, that is from 500 to 1,000 S. F. M., are seldom employed in commercial practice. Utilizing the same size cutter and the same tooth pitch as in the foregoing example relating to the use of high speed tool steel cutters, but increasing the chip load to .008 inch, will permit operation of cutters having carbide teeth at a feed rate of approximately 48 I. P. M.

It is well recognized that one of the major factors in shortening the life of a cutting tool is the vibration factor, which exists in all previously known types of cutters. As explained at page 317 of Section 17 of the Tool Engineers Handbook, 1949 Edition, the vibrations which occur in the teeth or cutting elements are of two kinds: (a) forced vibrations produced by successive contacts of the cutting teeth with the work and by irregularities in the force applied to the cutter by the driving means; and (b) self-induced vibrations due to the natural frequency of the cutting element or tooth and the mechanism employed for mounting the element or tooth on the body of the cutter. The self-induced vibrations are the most objectionable and, together with the forced vibrations, cause excessive wear and excessive heating of the cutting elements if the cutter is operated at speeds in excess of the above discussed maximums.

The relatively slow feed rates that have heretofore been considered to be the maximum possible rates that could be employed while maintaining a satisfactory tool life obviously cause the expense of machining or milling ferrous metals or carrying out similar metal removal operations to remain at a high level due to the large number of machines and the large number of man hours that are required to achieve continuous high production. Accordingly, it is another object of the invention to provide novel methods of machining ferrous work pieces wherein it is possible to increase the feed rates of the work pieces to an extent much greater than that which has been possible heretofore.

Another object of the invention is the provision of novel methods of machining ferrous materials wherein a cutter is employed having carbide cutting teeth mounted on the cutter body in such a fashion as to minimize vibrations and having a predetermined minimum pitch so as to permit operation at surface foot rates heretofore believed to be impossible.

A further object of the invention is to provide methods of machining ferrous materials wherein the work piece is moved at a feed rate greatly in excess of those heretofore employed.

A still further object of the invention is the provision of novel methods of machining ferrous materials wherein cutters having a tooth pitch of less than one-half inch are rotated in cutting engagement with work pieces at speeds far greater than those heretofore employed while still maintaining satisfactory cutter life.

In machining ferrous work pieces in accordance with the present invention, the cutters are operated at surface foot rates far in excess of anything heretofore believed possible, are provided with greatly increased numbers of cutting teeth by virtue of the employment of a much smaller tooth spacing or tooth pitch than was heretofore believed practicable, and are so constructed as to eliminate the tooth vibrations heretofore thought to be inevitable. Consequently, by the combination of these factors and by employing work piece feed rates correlated to the increased surface foot rates and minimum tooth pitch so as to maintain a proper chip load, a machining operation may be conducted at extraordinarily high speeds without reducing or shortening the cutter life.

By operating the properly constructed cutters, having a minimum tooth pitch, at high peripheral speeds and by maintaining the proper chip load, a number of advantageous results are obtained. Since with the minimum tooth pitch there will always be at least one tooth and more often a plurality of teeth in contact with the work piece at all times, a stabilizing action is effected which tends to reduce or eliminate chatter, and by forming the cutter either as a monolithic structure or as a structure wherein the cutting element or teeth are mounted in a relatively dead or non-resilient material, the vibrations heretofore encountered in machining operations are eliminated. Elimination of the vibrations is effective substantially to reduce the amount of heat generated during the travel of each individual tooth through the work and in addition the generation of heat is minimized by reason of the very short length of time that each individual tooth remains in contact with the work as compared to the interval of time between successive contacts of the same tooth with the work piece. Maintenance of a proper chip load by correlation of the surface foot rate and the feed rate, in addition to minimizing wear on the teeth or crushing of the teeth, is also effective to reduce heating of the cutting teeth, since substantially all of the heat generated is conducted away from the teeth by the chips, the teeth when formed of carbide being relatively poor heat conductors.

For a more complete understanding of the invention reference should now be had to the drawings, in which:

Fig. 1 is a diagrammatic representation in left hand end elevation of one type of apparatus that may be employed in practicing the methods of the present invention;

Fig. 2 is a similar diagrammatic representation in front elevation of the apparatus shown in Fig. 1;

Fig. 3 is an enlarged fragmentary view of a portion of one of the cutters shown in Figs. 1 and 2;

Fig. 4 is an end elevational view of the body portion or matrix employed in constructing another type of cutter capable of use in practicing the methods of the present invention;

Fig. 5 is a side elevational view, partly in section, of the body portion or matrix shown in Fig. 4;

Fig. 6 is a detail fragmentary view on a somewhat larger scale of a portion of the cutter body of Fig. 4, showing the cutting elements or teeth mounted therein;

Fig. 7 is a fragmentary plan view of a portion of the cutter shown in Fig. 6.

Figure 8:
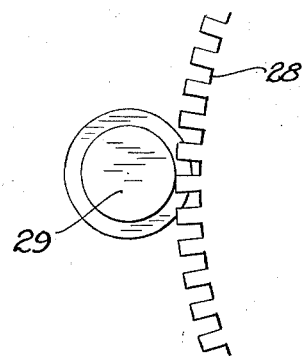
Figs. 8 and 9 are diagrammatic representations showing the manner in which a plurality of the cutter teeth contact the work piece in carrying out the methods embodying the present invention.

Referring now to Figs. 1, 2 and 3 of the drawing, these figures illustrate diagrammatically one form of apparatus employing peripheral cutters or slab mills for carrying out high speed machining operations embodying the methods of the present invention. The particular apparatus shown is of the type more fully disclosed in the said prior applications Serial Nos. 7,372 and 107,262, and is here shown as including a plurality of cutters 10 and 11 mounted on shafts 12 and 13, which are adapted to be driven so as to rotate the cutters as indicated by the arrows 14 and 15, thereby to engage the teeth on the cutters with the work piece 16, which is shown as constituting a round bar. Likewise, as more fully disclosed in the said copending applications Serial Nos. 7,372 and 107,262, the cutters 10 and 11 and the shafts 12 and 13 are rotated bodily about the axis of the work piece, as indicated by the arrows 17, and the work piece 16, which is held against rotation, is fed longitudinally between the cutters as indicated by the arrow 18 in Fig. 2.

While the cutters 10 and 11 shown in Figs. 1 and 2 are in the form of peripheral cutters or slab mills, it will be understood that other types of cutters, such, for example, as face mills or form mills, may be employed, and it will likewise be understood that the methods embodying the present invention may be carried out by a wide variety of apparatus other than that diagrammatically shown. For example, instead of rotating the cutters and their shafts bodily about the work piece, the axis of the shafts 12 and 13 may be fixed against rotation and the work piece 16 may be rotated as it is fed between the cutters 10 and 11.

The particular cutter shown in Figs. 1, 2 and 3 is of monolithic construction and is provided with a plurality of cutting teeth 19 which are ground into the exterior cylindrical face of the cutter, and it will be understood that the cutters 10 and 11 may be formed from a solid body of high speed tool steel or from a body of carbide material such as tungsten carbide, tungsten titanium carbide or such other powdered metallurgy carbide cutters as are commonly known and employed in the metal removal art.

The cutters 10 and 11 are provided with a maximum or near maximum number of cutting teeth having minimum or near minimum pitch, and the teeth 19 may be in the form of straight lines extending parallel to the axis of the cutter, or, as shown, they preferably take the form of a spiral or helical line wound about the cylindrical cutter, as is well known in the art. The pitch of the cutting teeth may vary, of course, depending upon the size of the cutter and the characteristics of the material being milled, but in carrying out the methods of the present invention, the tooth pitch will lie within the range of from 1/64 inch to ½ inch and is preferably ⅛ or ¼ inch. Each individual cutting edge or tooth may be ground or shaped to any desired configuration to provide clearance, etc., in accordance with the well known practices in the art, and the depth of the teeth may likewise vary. An important consideration is that the chip clearance space should be sufficient to permit the chip to form properly.

In operating the apparatus of Figs. 1 and 2 to carry out the methods of the present invention, the cutters 10 and 11 are rotated on the shafts 12 and 13 at speeds sufficient to provide a surface foot rate in excess of 1,000 feet per minute, and the shafts and cutters are rotated bodily about the work piece 16 at a speed which depends upon both the length of the cutters and the rate at which the work piece is fed longitudinally, the latter two factors being so correlated as to insure that the cutters follow helical paths about the work piece with a slight overlap, as indicated in Fig. 2, to prevent so-called "barber-poling" and to insure that the cutters cover the entire surface of the body. The rate at which the cutters are bodily rotated relative to the work piece is so correlated to the surface foot rate and the number of teeth on the cutter, as to provide a proper chip load or tooth load, and consequently if the length of the cutter, and the number of teeth are fixed, the speed of bodily rotation of the cutters about the work, and the rate at which the work piece is fed longitudinally, are proportional to the surface rate or R. P. M. of the cutters.

In a typical milling operation, cutters driven at approximately 1500 R. P. M. and having a diameter of approximately 4 inches and a tooth pitch of ¼ inch may be employed to mill a round bar to a depth of 1/32 of an inch, the rate of feed of the bar during the milling operation being approximately 600 inches or 50 feet per minute.

While monolithic cutters of the type shown in Figs. 1 and 2 are, from a performance standpoint, entirely satisfactory for practicing the methods embodying the present invention in that the teeth may have the necessary fine pitch and in that vibration of the teeth is eliminated, such cutters, particularly if formed of carbide, are relatively expensive, and in Figs. 4 to 7, inclusive, a built-up type of cutter is shown which is less expensive to construct and to maintain and which likewise operates satisfactorily in carrying out high speed machining operations embodying the present invention.

The milling cutter shown in Figs. 4 to 7, inclusive, is likewise of the peripheral type and includes a steel hub or core 20 which is circumferentially recessed to provide a pair of spaced flanges or rims 21 and 22. Each of the flanges 21 and 22 is provided with a plurality of spaced slots 23 which may be milled or otherwise formed in the flanges at any suitable angle so as to provide a helical arrangement of teeth, as shown best in Fig. 7. The helical tooth angle may vary from zero to approximately 25 degrees although an angle of 18 degrees is most commonly used. An angle substantially less than 18 degrees may, when milling certain types of work pieces, prevent the plurality of simultaneous tooth contacts which is so desirable in reducing forced vibrations, while an angle substantially greater than 18 degrees unnecessarily increases the lateral forces on the cutter which may be undesirable. In any event, a helical tooth angle substantially greater than 18 degrees provides no advantage which would offset the increased lateral forces. The slots 23 are equally spaced about the periphery of the cutter body and are adapted to receive the cutting teeth 24 which are held in position on the cutter body, as hereinafter explained, by partially embedding them in a mass of dead or non-resilient material such as organic plastic or low melting point metals or alloys.

In order firmly to hold the teeth 24 in the slots 23, the body 20 is provided with a plurality of axially extending holes 25 and a plurality of radially extending openings 26, which communicate with the axial holes 25 and with the circumferential recess between the flanges 21 and 22. After the teeth or blades 24 have been positioned in the slots 23, the assembly may be placed in a suitable mold wherein the plastic material indicated by the reference numeral 27 in Fig. 6 may be forced into the openings 25 and 26 and into the slots 23 and the space between the flanges 21 and 22, so as completely to surround and encase the cutting teeth.

After the molding operation has been completed, the plastic material 27 is first ground and partially removed from the cutting face of each blade so as to form a suitable chip clearance space, as shown in Fig. 6, and the blades or teeth themselves are thereafter ground first on the periphery and then on the cutting face to provide the finished cutter. The particular cutter shown in Figs. 4 to 7, inclusive, is twelve inches in diameter and is provided with 150 cutting teeth or blades, which provides a tooth pitch of approximately ¼ inch. The number of teeth can obviously be increased or decreased so as to provide a tooth pitch varying between $\frac{1}{8}$ inch and ½ inch, as desired.

Figure 9:
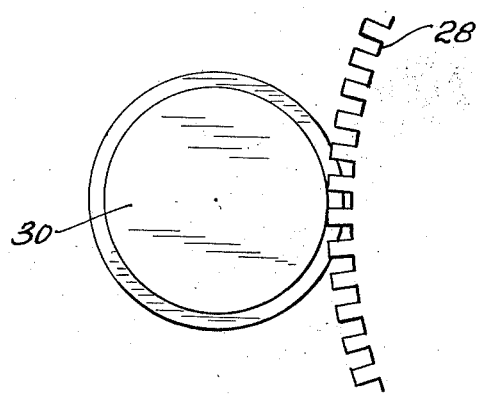

As previously indicated, the tooth pitch to be employed in accordance with the present invention is so chosen as to insure that a plurality of teeth are in contact with the work piece at all times, and it will be understood that the exact number of teeth thus in contact with the work piece at any one instant is dependent upon the diameter of the cutter, the diameter of the work piece in the case of round bars or the width of the work piece when being face milled, and the depth of the cut to be made. In Figs. 8 and 9, two illustrative examples are shown. The cutter and teeth indicated diagrammatically by the line 28 in Fig. 8 represent an eight inch diameter cutter having a ¼ inch tooth pitch employed in making a ⅛ inch deep cut in a one inch bar 29. Under these circumstances there will be three teeth in contact with the work at all times, which provides for the hereinbefore mentioned stabilizing action for the purpose of minimizing tooth vibration. In the example shown in Fig. 9, the same cutter is diagrammatically illustrated by the line 28, taking a ⅛ inch cut in a two inch bar 30 and in this case there will be four teeth in contact with the work at all times. In working on a four inch bar with this cutter there will be five teeth in contact with the work at each instant during the cutting operation.

When practicing the methods of the present invention employing the cutter of Figs. 4 to 7, inclusive, a surface foot rate of 1500 S. F. M. is entirely practical and is perhaps low. A surface foot rate of 1500 S. F. M. requires approximately 500 R. P. M. of the cutter and for 150 teeth with a tooth load of .005 inch, the feed rate is 375 I. P. M. This itself is many times greater than the 60–90 I. P. M. which is practiced today, and since the tool life or time between grinds is likewise improved, a much greater improvement in the RL factor is obtained. For example, the improvement in the R factor or I. P. M., assuming a mean value of 75 under present practices, is approximately 500%, but since the tool life is increased about four times, as evidenced by available test data, when practicing the present invention the RL factor is increased 2000%.

It has been found possible, moreover, for cutters provided with carbide teeth set and mounted in the manner described to have a surface foot rate of 6000 S. F. M. This results in an R. P. M. of 2000 and an increased feed rate of 1500 I. P. M. Although no milling machine made at the present time is capable of this feed rate, actual test runs have been made on a 4 inch diameter peripheral mill having 50 solid carbide blades set in plastic material. This test cutter was applied to the milling of a vanadium cast iron alloy having a BHN 220. The work piece was approximately one inch wide across the surface to be milled and was 48 inches long. The R. P. M. of the spindle carrying the cutter was 1462. Thus the surface foot rate of this four inch diameter peripheral mill was approximately 1500 S. F. M.

The machine on which the test was run was a Sundstrand No. 33 Rigidmil having a 25 H. P. motor. The machine feed table ordinarily has a feed rate up to 75 I. P. M. with a rapid traverse rate of 300 inches per minute. The table screw was disconnected from the source of power and was driven by a separate motor having a rated R. P. M. of 1200. The table screw had a half inch lead thereby enabling the feed table to move 600 I. P. M. at full motor speed. It was not possible to take a greater cut than .030 inch since the available horsepower was something less than 25. The operation under these conditions at 1500 S. F. M. and 600 inch table feed was excellent and the results included a very efficient chip formation with a resultant surface condition superior to any other known method of metal removal. The time required to cover the length of 48 inches of the work piece was 4 seconds, indicating a table feed rate of something slightly over 600 I. P. M.

If the foregoing test is compared with a standard or typical milling cut taken on the same material using a high-speed steel cutter, it is found that the surface foot rate for the high-speed steel would not be more than 50 S. F. M. The R. P. M. of the spindle would be decreased to approximately 46 R. P. M. The steel cutter having a 4 inch diameter would not have more than 12 teeth nor could it take a chip load greater than .005 inch, thereby resulting in a feed rate of 2.76 I. P. M.

Even if a monolithic 4 inch diameter cutter made of high-speed steel were used having the same tooth pitch as in the carbide cutter on which the test was run, the resultant table feed rate using the same chip load of .005 inch would be 12 I. P. M. This test run can be still further compared with a carbide milling cutter of traditional design wherein carbide teeth are mechanically held by means of wedges. In a 4 inch cutter of this type there would be a maximum of 8 teeth. Using, then, a chip load the same as for the high-speed steel but a surface foot rate of 500, the feed rate would be 18 I. P. M. A higher chip load can be used with carbide and if it were to be increased to .010 inch, then the feed rate would be increased to 36 I. P. M. In no event could it ever be increased to the 600 I. P. M. actually carried out in the test.

A second test run on the 4 inch peripheral mill having 50 carbide teeth was carried out on the same machine but using standard SAE 1020 steel as the work piece. All other conditions were the same including chip load, S. F. M., and table feed rate of 600 I. P. M., and again the results were excellent both from the standpoint of finish and accuracy.

Another consideration in increasing the table feed rate in all instances is the amount of power which may be supplied to a given machine tool. The chip load can be increased within the limits of the cutter only to the extent of available power. Here again it is important to note that the method of milling and the cutter used, both of which are involved in the present invention, require less power for a given tooth load than that required in present day practice. The power requirements of a machining operation are commonly known as the K factor, which is defined as the H. P. per cubic inch of metal removed per minute. It is evident that the lower the K factor, the greater the advantages arising out of a given method or technique of milling because a greater number of cubic inches of metal can be removed per minute with a given amount of power available.

The following tables will serve to compare these K factors with various metals under present techniques and under the method and cutter of the present invention.

*K Factor for Steel*

| BHN | K Factor Cubic Inches/Min./H. P.— Present Technique | K Factor H. P./Cubic Inch/Min.— Present Technique | K Factor H. P./Cubic Inch/Min.— Technique of This Invention |
|---|---|---|---|
| | A | B | C |
| 100 | .8 | 1.25 | .3 |
| 150 | .7 | 1.43 | .35 |
| 200 | .65 | 1.5 | .4 |
| 250 | .6 | 1.66 | .5 |
| 300 | .55 | 1.88 | .6 |
| 400 | .5 | 2.0 | .75 |

The above table was taken from the American Machinist Handbook, 1945 Edition, page 389. The column at the extreme left indicates the BHN for a given steel. Column A is the K factor for the given steel in terms of cubic inches of metal removed per minute per H. P. The K factor under discussion in the present invention is in terms of H. P. per cubic inch per minute; therefore the reciprocal of Column A must be used to determine the corresponding K factor under discussion. This is set forth in Column B and indicates the K factor required for present known methods and cutters. Column C indicates the corresponding K factor or H. P. per cubic inch per minute required when utilizing methods characterized by the features of this invention.

The following table is reproduced as a portion of Table 8 appearing on page 1817 of Mark's Mechanical Engineer's Handbook, 1941 Edition. The first column indicates the recognized K factor required for present known methods and cutters for the materials indicated. The second column indicates the corresponding K factor when utilizing the methods characterized by the features of the present invention.

| Metal | K Factor Present Method | K Factor Method of This Invention |
|---|---|---|
| Cast Iron (Hard) | 0.7 | .35 |
| SAE 1112 Cold Drawn | 1.05 | .3 |
| Rustless Steel | 1.2 | .33 |
| SAE 1020 Forged | 1.25 | .4 |
| SAE 2345 Forged | 1.25 | .4 |

It will be evident from the foregoing tables that the power required to remove a given amount of metal under the method and operating conditions of the present invention is greatly decreased, thereby permitting a greater amount of metal removal in terms of cubic inches per minute with any given amount of power.

The H. P. required to remove metal depends upon the rate in cubic inches per minute at which the metal is being machined or removed. The rate in cubic inches per minute depends upon three factors, namely, the width of the cut, the depth of the cut, and the feed rate. As pointed out previously, the feed rate is the product of the tooth load times the number of teeth in the cutter times the R. P. M. of the spindle. Thus, varying the width of the cut, the depth of the cut or the tooth load will vary the H. P.

To determine these K factors for various materials, test runs were made on a Sundstrand 25 H. P. high-speed Rigidmil especially equipped for high table feed rates. The cutter had an 8 inch diameter with 70 carbide blades mounted in plastic in accordance with the present invention. As before, the machine was modified to increase the feed rate to 600 I. P. M. The test bars for this run consisted of "Stressproof" steel, SAE 1020, and Meehanite. These bars were one inch wide by four inches high by 40 inches long.

The spindle speed selected was 1462 R. P. M. and with a feed rate of 600 inches per minute, this resulted in a chip load of slightly more than .005 inch. The depth of cut was .050 inch and, in accordance with the above formula of determining the cubic inches per minute of metal removed, the latter was determined to be 30 cubic inches.

Since the available H. P. at the cutter for this series of runs was approximately 20 and the amount of metal removed per minute was 30 cubic inches, the K factor was approximately .67. That is, the K factor was less than 1 H. P. per cubic inch per minute. In the use of high-speed steel cutters or cutting elements, the K factor for normal steels (180 to 200 BHN) is 2. The K factor for the traditional carbide technique is 1.25, while for the method used and involved in the present invention, it is in the neighborhood of .5.

For cast irons, the K factor using high-speed steel is approximately 1.5. For the traditional carbide technique, the K factor is .6, while for the high-speed carbide method of this invention it is .3.

There is nothing in the method herein and the design of the cutter which limits the depth of cut. The sole restriction lies in the relatively low horsepowers that are available in modern spindles even when considering those having the highest horsepowers. If 100 H. P. were available, then the depth of cut could readily be increased to approximately .180 inch. This is determined by multiplying the 1 inch width cut by the .180 inch depth of cut by 600 I. P. M. feed rate, which equals 108 cubic inches of metal removed per minute. This requires slightly less than 100 H. P. in steel and approximately 40 H. P. in cast iron. The foregoing tests indicated that the results of the method and cutter employed herein in terms of metal removal are excellent.

From the foregoing considerations, it will be clear that the new and improved method of machining a component or work piece in accordance with the present invention, involves the ability to increase, by at least as much as ten times, the feed rates which have heretofore been possible with existing cutters and techniques, and at the same time to increase the RL factor by as much as forty times. To summarize briefly, it may be stated that the surface foot rates on ferrous materials with cutters having carbide cutting elements, up to the present time, have exceeded 500 S. F. M. but rarely, and have never exceeded 1000 S. F. M. In accordance with the present invention, this surface foot rate has actually been increased to at least 2500 S. F. M. with an indication that 10,000 or 20,000 S. F. M. would not be excessive depending on machine construction. This latter speed is indicated because in the test runs, the cutter was revolving at one-fourth speed due to the feed rate limitations of the machine. Furthermore, the cutter design and method involved enables the feed rate for the work piece to be increased from the usual maximum of 60 I. P. M. at the present time to at least 600 I. P. M. with increased cutter life and a consequently greatly increased RL factor. Moreover, surface rates of at least 2400 I. P. M. are indicated when and if it is possible to obtain machines capable of running at such high feed rates.

The cutter design which involves the placement of cutting elements in a plastic matrix dampens the vibrations to such an extent that greatly increased surface foot rates become available, and by mounting the cutting elements in this manner, it is also possible to increase the number of teeth per circumference inch over the present practice. Likewise, a greater range of tooth loads may be employed without damage to the cutter and with a resultant superior surface condition on the finished product. Under prior practices chip loads outside the range of .005 inch to .015 inch were considered impractical either from the standpoint of tool life or surface finish. In practicing the present invention, however, the range of satisfactory tooth loads, depending upon the usual recognized factors, may vary from .001 inch to .025 inch.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. The improvement in the art of machining ferrous metals, which comprises moving a continuous series of cutting teeth having a tooth spacing of one half inch or less successively into engagement with a ferrous metal workpiece at a tooth travel rate in excess of one thousand feet per minute, maintaining at least two of said teeth in engagement with said workpiece at all times during the cutting operation, thereby to minimize individual tooth vibration while said teeth are engaged with said workpiece, and moving said workpiece and said teeth relative to each other at a feed rate sufficiently in excess of ninety inches per minute to produce continuous effective chip loading of all of said teeth while engaged with said workpiece, thereby to minimize wear and heating of said teeth due to engagement of said teeth with said workpiece.

2. The improvement in the art of machining ferrous metals, which comprises moving a continuous series of cutting teeth formed integral with a tooth supporting body and having a tooth spacing of one half inch or less successively into engagement with a ferrous metal workpiece at a tooth travel rate in excess of one thousand feet per minute, maintaining at least two of said teeth in engagement with said workpiece at all times during the cutting operation, thereby to minimize individual tooth vibration while said teeth are engaged with said workpiece, and moving said workpiece and said teeth relative to each other at a feed rate sufficiently in excess of ninety inches per minute to produce continuous effective chip loading of all of said teeth while engaged with said workpiece, thereby to minimize wear and heating of said teeth due to engagement of said teeth with said workpiece.

3. The improvement in the art of machining ferrous metals, which comprises moving a continuous series of cutting teeth having a tooth spacing of one half inch or less successively into engagement with a ferrous metal workpiece at a tooth travel rate in excess of one thousand feet per minute, damping said teeth against vibration while engaged with said workpiece, maintaining at least two of said teeth in engagement with said workpiece at all times during the cutting operation, thereby further to minimize individual tooth vibration while said teeth are engaged with said workpiece, and moving said workpiece and said teeth relative to each other at a feed rate sufficiently in excess of ninety inches per minute to produce continuous effective chip loading of all of said teeth while engaged with said workpiece, thereby to minimize wear and heating of said teeth due to engagement of said teeth with said workpiece.

4. The improvement in the art of machining ferrous metals, which comprises moving a continuous series of separately formed carbide cutting teeth having a tooth spacing of one half inch or less successively into engagement with a ferrous metal workpiece at a tooth travel rate in excess of one thousand feet per minute, supporting said teeth in a matrix of vibration-damping dead material, thereby to damp said teeth against vibration while engaged with said workpiece, maintaining at least two of said teeth in engagement with said workpiece at all times during the cutting operation, thereby further to minimize individual tooth vibration while said teeth are engaged with said workpiece, and moving said workpiece and said teeth relative to each other at a feed rate sufficiently in excess of ninety inches per minute to produce continuous effective chip loading of all of said teeth while engaged with said workpiece, thereby to minimize wear and heating of said teeth due to engagement of said teeth with said workpiece.

5. The improvement in the art of machining round ferrous metal bars, which comprises moving a continuous series of cutting teeth having a tooth spacing of one half inch or less successively into engagement with a ferrous metal bar at a tooth travel rate in excess of one thousand feet per minute, maintaining at least two of said teeth in engagement with said bar at all times during the cutting operation, thereby to minimize individual tooth vibration while said teeth are engaged with said bar, moving said bar and said teeth relative to each other at a feed rate sufficiently in excess of ninety inches per minute to produce continuous effective chip loading at all of said teeth while engaged with said bar, thereby to minimize wear and heating of said teeth due to engagement of said teeth with said bar, and relatively rotating said teeth and said bar at a speed in excess of that required to cause said teeth to cover the entire surface of said bar.

6. The improvement in the art of machining round ferrous metal bars, which comprises moving a continuous series of separately formed cutting teeth having a tooth spacing of one half inch or less successively into engagement with the surface of a round ferrous metal bar at a tooth travel rate in excess of one thousand feet per minute, supporting said teeth in a matrix of vibration-damping dead material, thereby to damp said teeth against vibration while engaged with said bar, maintaining at least two of said teeth in engagement with said bar at all times during the cutting operation, thereby further to minimize individual tooth vibration while said teeth are engaged with said bar, moving said bar and said teeth relative to each other at a feed rate sufficiently in excess of ninety inches per minute to produce continuous effective chip loading of all of said teeth while engaged with said bar, thereby to minimize wear and heating of said teeth due to engagement of said teeth with said bar, and relatively rotating said teeth and said bar at a speed in excess of that required to cause said teeth to cover the entire surface of said bar.

THEODORE S. SEE.

REFERENCES CITED

The following references are of record in the file of this patent:

UNITED STATES PATENTS

| Number | Name | Date |
| --- | --- | --- |
| 1,492,347 | Beisser | Apr. 29, 1924 |
| 2,213,251 | Lundberg et al. | Sept. 3, 1940 |
| 2,215,007 | Kraus | Sept. 17, 1940 |
| 2,278,738 | Praeg | Apr. 7, 1942 |
| 2,350,974 | Grayson | June 6, 1944 |
| 2,497,023 | Austin | Feb. 7, 1950 |